Patented June 5, 1945

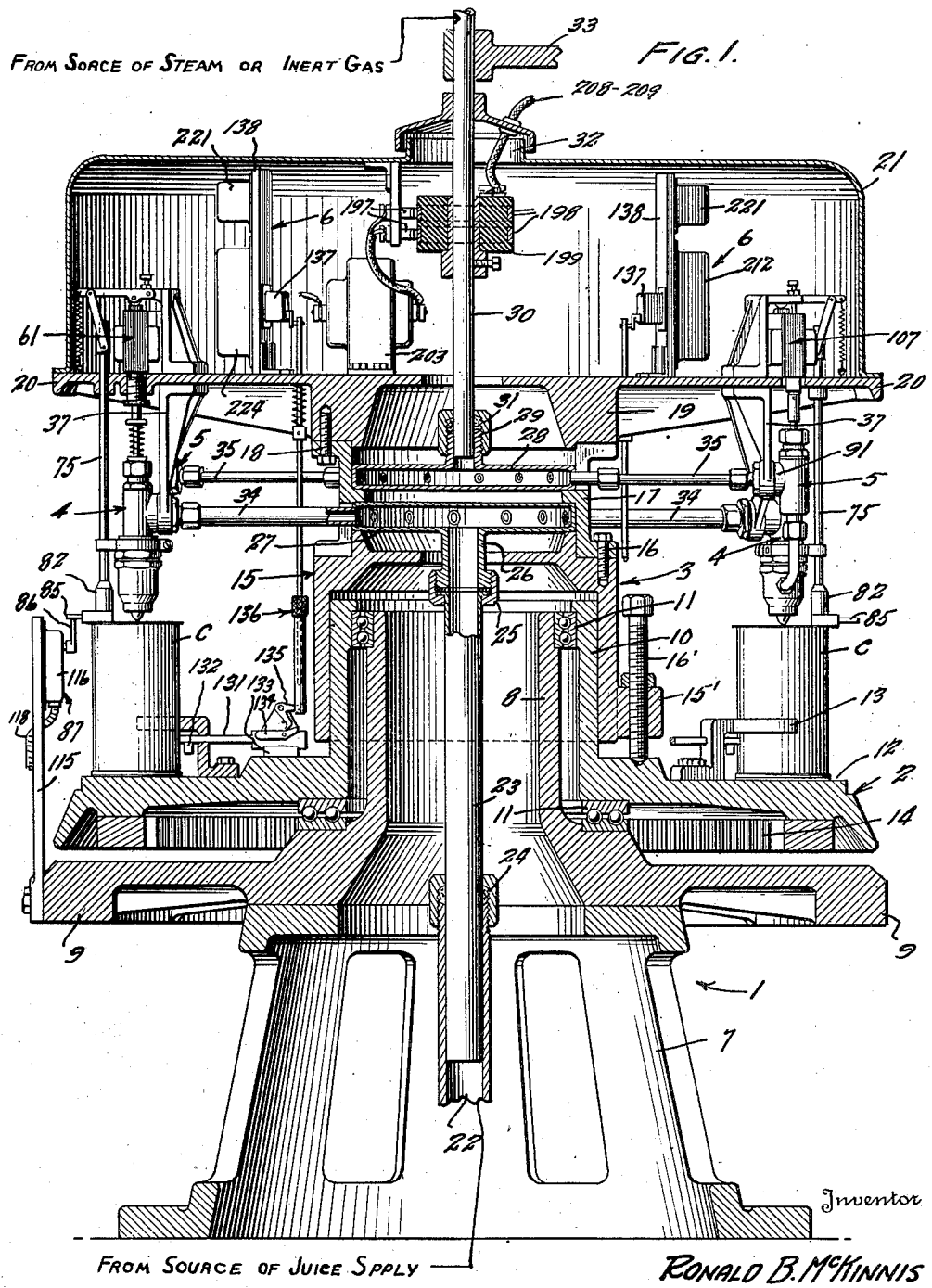

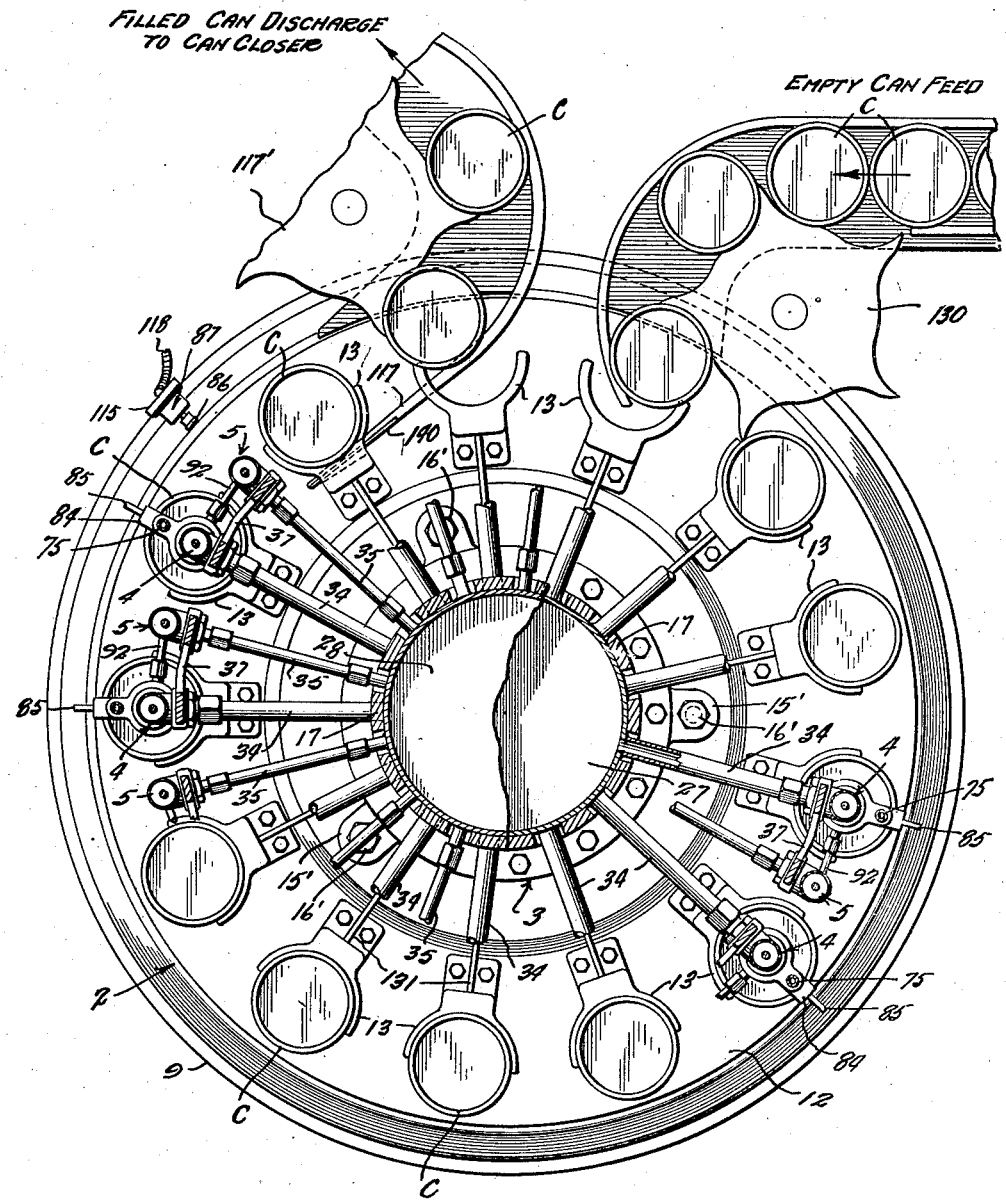

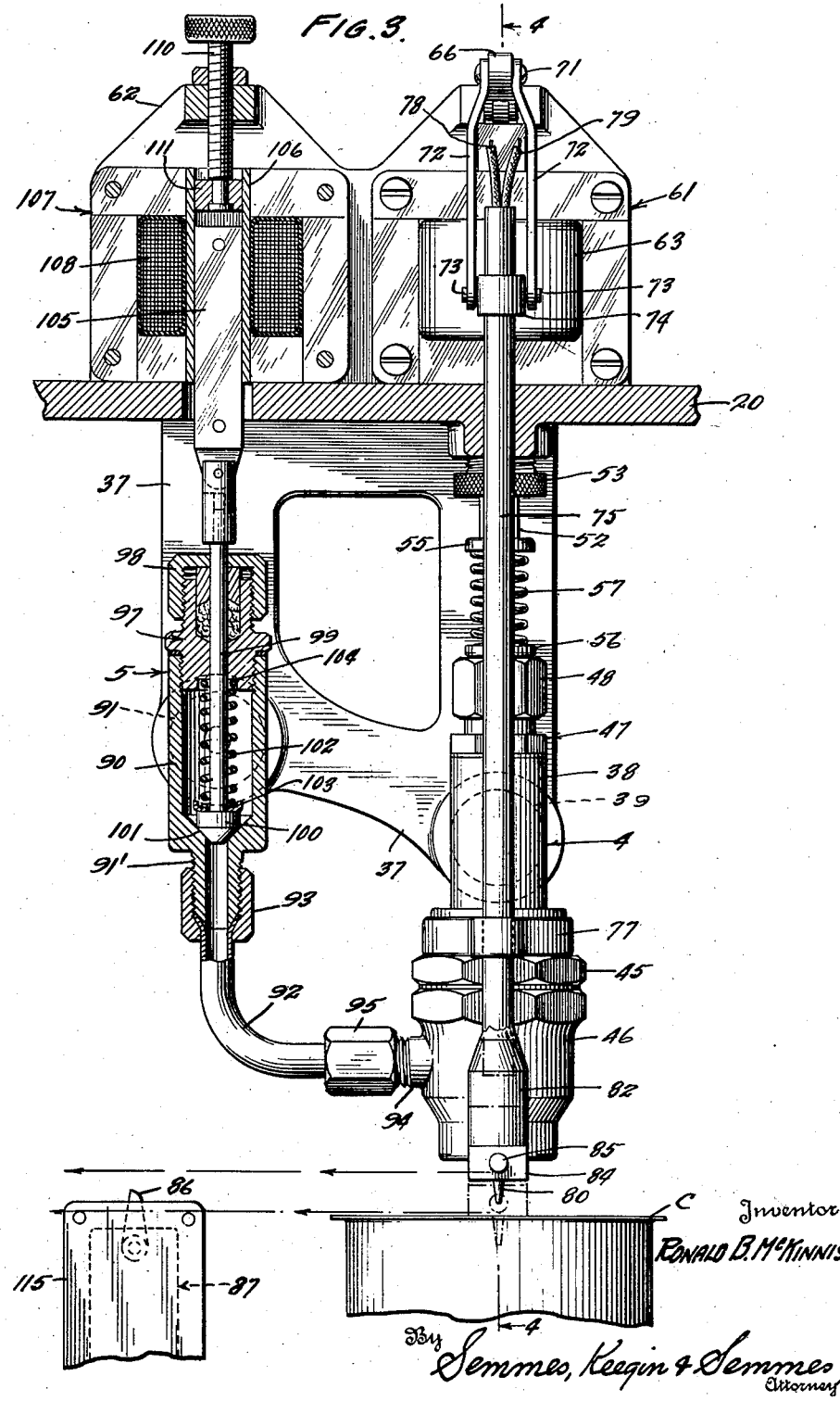

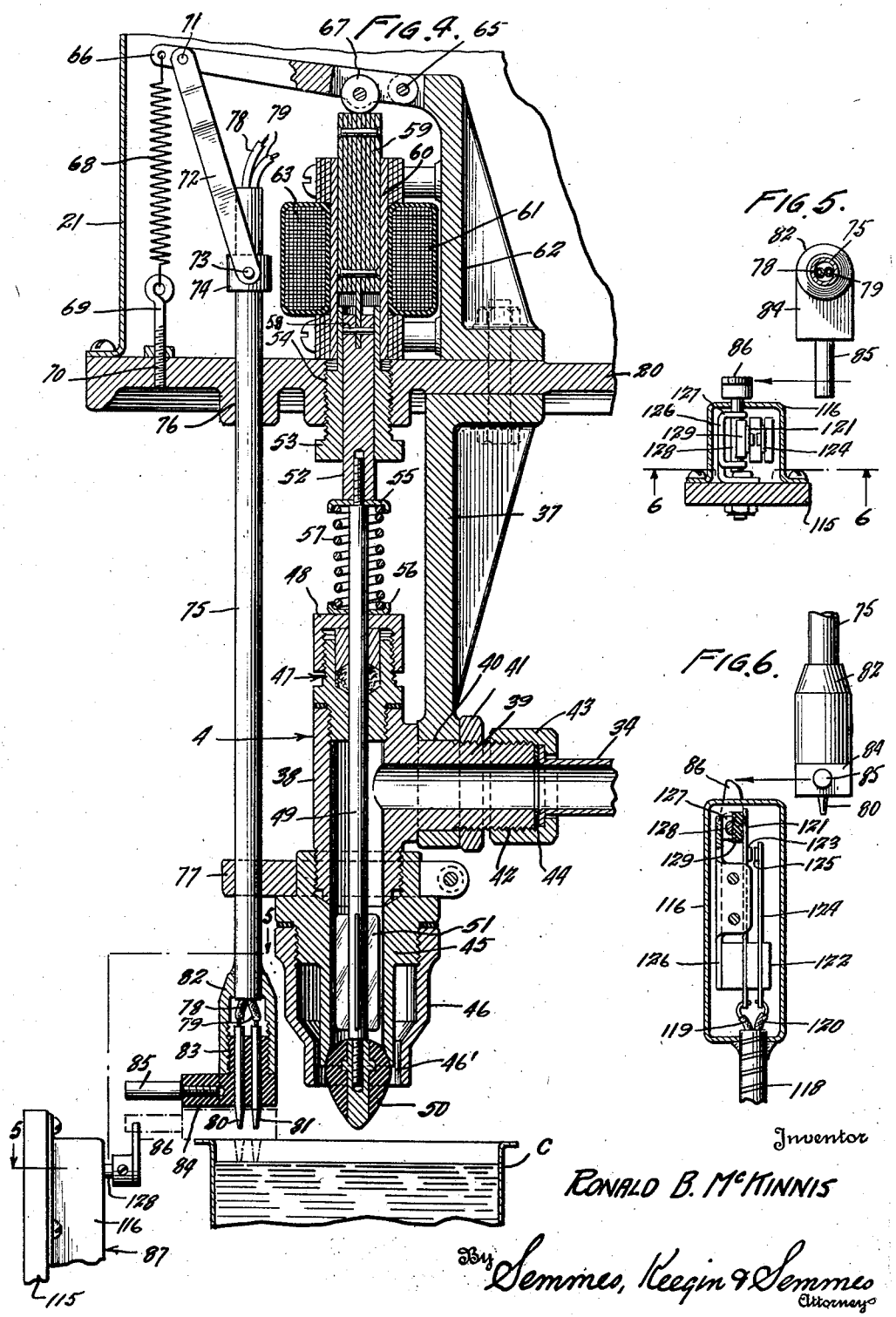

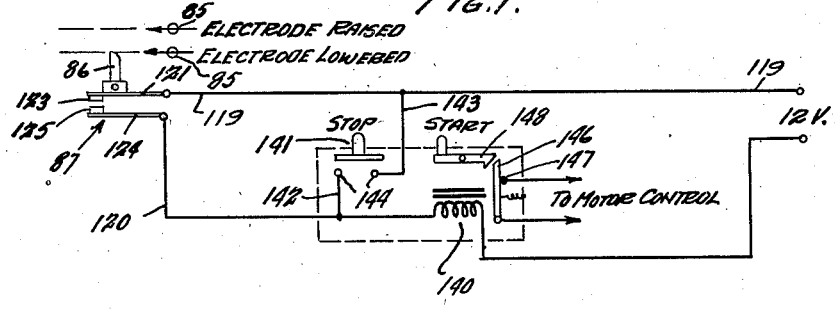
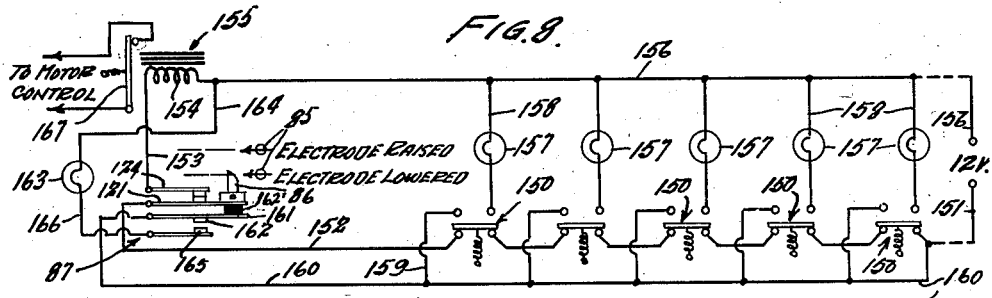
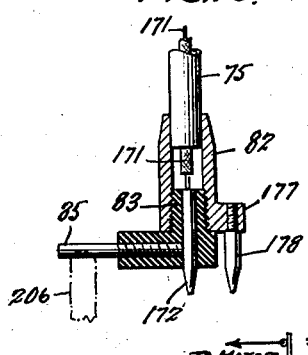
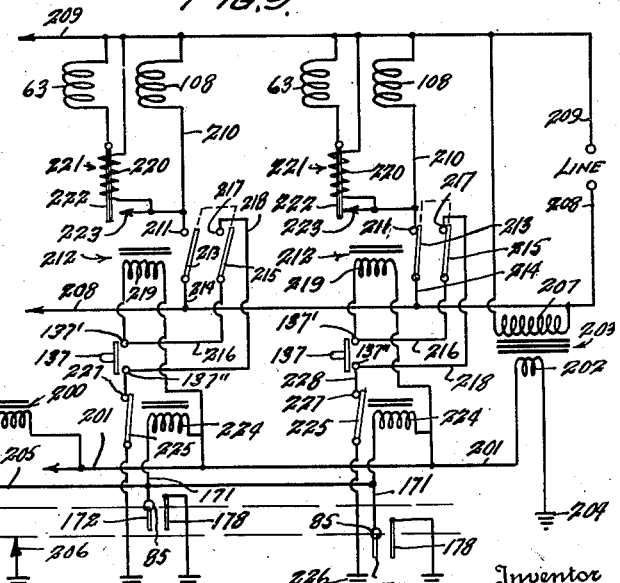

2,377,796

UNITED STATES PATENT OFFICE 2,377,796

APPARATUS FOR INTRODUCING LIQUIDS INTO CONTAINERS

Ronald B. McKinnis, Winter Haven, Fla.

Application February 26, 1943, Serial No. 477,300

9 Claims. (Cl. 226—68)

The present invention relates to apparatus for rapidly filling containers with liquids and especially to apparatus for filling containers with liquids that are subject to oxidation. More specifically, there is provided an apparatus whereby an unfilled or partially filled container will be prevented from moving from the filling machine to the sealing machine. While my inventive concept finds particular application in filling fruit and vegetable juices into containers, it is, of course to be understood that it may be employed for filling other liquids.

This application is directed to the apparatus shown in my co-pending application, Serial No. 402,830, filed July 17, 1941.

Extreme care must be used in filling containers with fruit and vegetable juices to prevent oxidation of the juices. While it is true that many machines have been heretofore designed to rapidly fill containers with oxidizable liquids under conditions which would prevent the oxidation of the juice, these machines have been on the whole most unsatisfactory. The majority of these prior machines have employed tanks or bowls for containing the oxidizable liquid. This is undesirable for several reasons, some of which are as follows: (A) it prolongs the heating of the juice, (B) it allows separation of the solid particles, (C) it imparts a cooked flavor to the juice, (D) it exposes the juice to oxidation by air, and (E) it allows the evaporation of the more volatile constituents of the aroma.

The prior machines have been complex in construction, are not adaptable to various sizes of containers, and are difficult to clean and maintain sanitary. Furthermore, they allow too much exposure of the juice to the action of atmospheric oxygen.

In addition, one of the following principles has been used to control the quantity of juice introduced into the container: (1) weighing of the liquid or of the liquid and the container, (2) volumetric measurment of the liquid before it is introduced into the container, (3) rate of flow of the liquid and timing the exposure of the container to the liquid, (4) volume filling of the container while sealed to the filling device.

Experience has shown that controlling the degree of filling by the weight of the liquid or by the weight of the container plus the liquid is not a simple matter for high speed filling. The necessary inclusion of weighing devices into a filling machine and the problem of adapting these devices to a high capacity filling machine which is exposed to water and corrosive juice, present defects which discourage any success for controlling the amount of liquid filled along this line.

The volumetric measurement of the juice before it is admitted into the container is practical for high speed filling, but it is not suitable for fruit and vegetable juices by any devices now known to the art. The fillers in use are generally of the pocket or piston type. The first type is unsuitable because of the exposure and re-handling of the juice, and while the latter type can operate directly from the pipe source of supply, it is handicapped by corrosion and mechanical complications.

The rate of flow principle has been employed by maintaining a constant speed for the container as it moves below a constantly regulated flow of the juice. The flow rate is regulated in such a manner as to fill the container to the desired height. However, this particular method is objectionable due to the difficulties that are encountered when the filling operation is started and arrested.

The most widely used juice filling machines employ the container as the measuring means while the container is sealed to the filling device. This type of apparatus is simple and accurate, but it nevertheless possesses numerous faults—the main one being that during the first part of the filling operation the containers are attached to the valves by a rubber gasket or seal, making an airtight connection. When the valve is opened, the container is completely filled and the juice rises into a vent pipe to the same level as in the tank. When the valve is closed and the seal is broken, the juice in the vent pipe then flows into the container. It is possible to adjust the degree of fill by changing the dimensions of the various elements. The principal objection to this type of filler is the cleaning of the numerous parts to maintain a sanitary condition.

Finally, none of these prior filling machines, insofar as I am aware, has been provided with any means whereby an unfilled or a partially filled container is prevented from leaving the filling machine and moving into the sealing machine.

One object is to overcome the disadvantageous features now present in the art.

An important object is to provide an apparatus whereby an unfilled or partially filled container will be prevented from leaving the filling machine and passing to the sealing machine.

Another object is to provide an apparatus for filling containers with an oxidizable liquid wherein the container is first subjected to the influence of steam or an inert gas to purge the container of the air and then to introduce the liquid surrounded by a protective blanket of steam or inert gas into the container.

Yet another object is to provide an apparatus whereby the filling machine will be stopped when a partially filled or unfilled container arrives at a predetermined point.

And yet an additional object is to provide an apparatus for filling containers that can be used to fill containers of various sizes.

To accomplish the above and other important objects, the invention comprises conveying empty open top containers to a filling stage wherein the container is first purged of atmospheric air by a jet of an inert gas or steam. After the expiration of a predetermined period of time, the juice is introduced into the container surrounded by a protective blanket of inert gas or steam. Upon the container being filled to the desired level, the flow of juice and the protective blanket of steam or inert gas is automatically arrested and the container moves from the filling machine to the sealing machine.

If, however, the container is unfilled or partially filled, control means is effective when the container reaches a certain location to stop the filling operation and movement of the container, thereby preventing the container from moving into the sealing machine.

In order to make my invention more clearly understood, I have shown in the accompanying drawings means for carrying the same into practical effect without limiting the improvements in their useful applications to the particular constructions which, for the purpose of explanation, have been made the subject of illustration.

Figure 1 is a transverse sectional view taken through the filling machine illustrating the various elements constituting the apparatus.

Figure 2 is a top plan view, partly broken away, showing the filling table and also illustrating the manner in which the empty containers are fed into the machine and the manner by which the filled containers leave to go to the sealing machine.

Figure 3 is a view, partly in section, illustrating the steam or inert gas valve and juice valve.

Figure 4 is a sectional view taken along the line 4—4 of Figure 3 looking in the direction of the arrows.

Figure 5 is a sectional view taken along the line 5—5 of Figure 4 looking in the direction of the arrows.

Figure 6 is a sectional view taken along the line 6—6 of Figure 5 looking in the direction of the arrows.

Figure 7 is a diagrammatic showing of the circuit for the cut-out switch.

Figure 8 is a diagrammatic showing of another electrical circuit that can be used.

Figure 9 is a diagrammatic illustration of an electrical circuit controlling the operation of the filler.

Figure 10 is a detail view in section of a modified type of shut-off electrode that may be employed.

In Figure 1, I have shown a pedestal 1 having rotatably mounted thereon a filling table 2. Telescoped on the table and rotatable therewith is a super-structure 3 which supports juice valves 4, steam or inert gas valves 5 and control units 6. There is one control unit, juice valve, and steam valve for each container that can be fed onto the machine.

Pedestal 1 comprises, a base 7, hub 8, and a horizontal sub-plate 9. The table 2 is provided with a hub 10 that rotates about the hub 8 on anti-friction bearings 11. Integrally formed with the hub is a horizontal annular surface 12 that carries a plurality of yokes 13, the purpose of which will be more fully described, spaced equi-distant from each other and that are positioned radially with the hub 10. Rotary movement is imparted to the table through ring gear 14 attached thereto, and a pinion (not shown). The pinion may be driven by a motor or through suitable gearing from the container closer or other associated apparatus.

The super-structure 3 includes a sleeve 15 which telescopes the hub 10 and rotates therewith. A plurality of ears 15' are formed on the sleeve adjacent to the lower end and a screw jack 16' is threaded onto each ear. By rotating the screw jacks, the position of the super-structure relative to the annular surface 12 may be varied and this arrangement is desirable in that an easy adjustment of the machine to accommodate containers of different heights can be effected. Attached to the upper end of the sleeve 15, as shown at 16, is a flanged collar 17. Bolted to the upper flange of the collar 17 at 18 is boss 19 of a base member 20. A cover 21 is removably secured to the base 20 in any convenient manner and as will later become more fully apparent, the cover forms a fluid protected housing for the various control units of the machine.

As best shown in Figure 1, a juice conduit 22 connected to a source of supply (not shown) extends upwardly through the pedestal 1. A second tube 23 telescopes in the conduit 22 and a packing gland 24 affords a fluid-tight fit between the tubes 23 and 22. The upper end of the tube 23 is coupled, as shown at 25, to nipple 26 of a juice manifold 27 supported suitably within the collar 17. Disposed above and spaced from the manifold 27 is a steam or inert gas manifold 28 having a nipple 29. A steam conduit 30 is rotatably connected to the nipple 29 by a packing gland, as shown at 31, and the conduit extends through a covered centrally located opening 32 provided in the upper wall of the cover 21. Bracket 33 maintains the conduit 30 against rotary movement, and the conduit 30 extends to a source of steam or inert gas (not shown).

Referring to Figures 2 and 4, it can be seen that a plurality of radial pipes 34 extend from the juice manifold 27 and each pipe is in communication with a juice valve 4. The steam or inert gas manifold 28 is likewise provided with a plurality of pipes 35 that extend to each of the steam valves 5.

The juice valve 4 is best illustrated in Figures 3 and 4, and it will be noted that a bracket 37 is fixed to the lower face of the base member 20. Valve body 38 of the valve 4 is formed with a lateral extension 39 which extends through an opening 4 in one of the arms of the bracket 37 and is held thereto by nut 41. The extension 39 is externally threaded, as shown at 42, and the pipe 34 is attached thereto by coupling 43, and a washer 44 provides a leak-proof union.

The lower end of the valve body 38 has threaded thereon a juice nozzle 45 and removably fixed to the nozzle 45 is a jacket 46 reduced at its lower end to closely surround the nozzle 45 to form an annular orifice 46' to direct steam or inert gas into the container from the valve 5, as will later be more fully described.

The upper end of the valve body is closed by a gland 47 which is adjusted by a cap 48. A valve stem 49 extends through the valve body and has a valve head 50, preferably made of neoprene and substantially ovoid in cross section, removably secured thereto. Disposed immediately above the valve head 50 and carried by the stem 49 are a plurality of diametrically opposed fins 51 which function to straighten out the flow of juice entering the valve body 38 through the radial pipe 34.

The upper end of the stem 49 is attached to a connecting link 52 which is slidable in an adjustable sleeve 53 threaded in an aperture 54 formed in the base 20. Surrounding the stem 49 between the lower end of the link 52 and the cap 48 is a helical spring 57 retained in spring cups 55 and 56. The spring 57 normally maintains the valve 50 in its closed position, or in the position illustrated in Figure 4.

The connecting link 52 is attached, as shown at 58, to an armature 59 which slides in a barrel 60 of a solenoid construction indicated 61. The solenoid 61 is, of course, attached to a bracket 62 that is secured to the base plate 20 in any convenient manner. The solenoid has a conventional winding 63 and when the winding is energized, it is adapted to lower the armature 59 until the lower end thereof contacts the upper portion of the sleeve 53. This action compresses the spring 57 and causes the valve 50 to open enabling the juice to leave valve body 38 through the nozzle 45 and into the open container. It should be stressed that by changing the vertical position of the sleeve 53, it is possible to regulate the amount of valve opening which is very desirable.

Hinged to an arm of the bracket 62, as indicated at 65, is a bifurcated arm 66 and a roller 67 supported in the bifurcation contacts the upper end of the armature 59. Attached to the free end of the arm 66 is one end of a spring 68, the opposite end of which is attached to an eye screw 69 which is threaded into the base plate 20, as shown at 70. The spring 69 serves to pull the arm 66 downwardly about its hinge 65 but the helical spring 57 surrounding valve stem 49 is of such strength as to offset the action of the spring 69 and normally maintain the parts in the position shown in Figure 4.

Pivoted, as shown at 71, to the arm 66 is a pair of links 72. The lower ends of the links 72 are attached to trunnions 73 on a collar 74 that is secured to a conduit 75. The conduit 75 extends through an aperture 76 in the base plate 20 and through a bracket 77 carried by the member 45. Electrical conductors 78 and 79 pass through the conduit 75 and carry electrodes 80 and 81, respectively, at their lower ends. Attached to the lower end of the conduit 75 is a fitting 82 and threaded therein is an insulating block 83 through which project the electrodes 80 and 81. The block 83 is formed with a lateral extension 84 into which is fixed a pin 85 that is adapted when the block 83 is in its lowered position to contact a finger 86 of a cut-off switch indicated generally 87, as will become more fully apparent.

In the lowermost position of the block 83 (dot-dash lines, Figure 4), it is adapted to rest on the rim of a container C into which the juice is to be introduced and the electrodes 80 and 81 project downwardly into the container. This will give a constant height to the juice in each container since the height of the liquid in each container is dependent on the amount that the electrodes project beyond the bottom surface of the block 83.

The position of the fulcrum 67 with respect to the length of the arm 66 is such that any opening movement of the valve will cause block 84 to contact the rim of the container.

The steam or inert gas valve 5 includes a body portion 90 (Figure 3) having a lateral extension 91 which is anchored in the bracket 37 in a manner similar to that described for the valve 4. The body 90 is provided with a reduced end 91' and one end of a conduit 92 is coupled thereto, as shown at 93. The free end of the conduit 92 is fixed to an extension 94 on the jacket 46 by a fitting 95. Referring to Figure 4, it will be noted that the tube communicates with the jacket that surrounds the nozzle 45. The upper end of the body 90 is closed by a gland 97 and cap 98 maintains the gland in the proper position.

Projecting through the gland 97 and extending into the valve body 90 is a stem 99 carrying at its lower end a conical valve head 100 adapted to rest on a valve seat 101. Surrounding the stem 99 is a spring 102, the lower end of which fits within a cup 103 positioned adjacent the upper face of the valve head. The other or upper end of the spring 102 fits within a recess 104 formed in the gland 97. The spring 102 tends to hold the valve 100 in its seated position.

The upper end of the stem 99 is attached to an armature 105 which slides in a barrel 106 of a solenoid member indicated 107 having a conventional winding 108.

The armature is kept in its lowered position by virtue of the spring 102. An adjusting screw designated 110 supported by the bracket 62 extends into the upper end of the barrel 106 and carries a block 111 which contacts the upper face of the armature 105 when the armature is in its uppermost position. By rotating the screw 110, it is possible to vary the extent of the upward movement of the armature, and consequently limit the amount that the valve head 100 opens.

When the winding 108 is energized, the armature 105 is raised, thereby compressing the spring 102 and moving the valve head 100 away from its seat 101. This, of course, permits the steam or inert gas to flow from the manifold 28 through the conduit 35, valve body 90, tube 92, into the jacket 46, and through the orifice 46' into the interior of the container.

The cut-out switch 87 is best illustrated in Figures 4 to 6 inclusive, and it will be observed (Figure 1) that a support 115 is attached to the base 9 of the pedestal 1 and carries at its upper end a switch casing 116. Referring to Figure 2, the switch 87 is located at a point adjacent the inner end of a wiper 117 which moves the containers from the filling table when they are moved to a container closing machine, by any means, such as, a star wheel 117'.

Extending into the lower end of the casing 116 is a flexible cable 118 through which extend electrical conductors 119 and 120. A spring arm 121 is attached to conductor 119 and is mounted in an insulating block 122 suitably supported within the casing 116. A contact point 123 is carried by one face of the spring arm 121. Similarly, the lead 120 has connected thereto a spring arm 124 which supports a contact point 125 adapted to make contact with point 123.

Suitably supported within the casing 116 is a U-shaped bracket 126 provided with ears 127 in which is journaled a shaft 128 which carries a cam block 129 of insulating material which contacts the end of the spring arm 121. The finger 86 is fixed to the shaft 128.

It will be appreciated therefore that when the pin 85 trips the finger 86, the cam block 129 will move the contact point 123 into engagement with point 124, thereby completing an electrical circuit to the driving motor control to be later more fully described.

This arrangement provides means, so that should a container be unfilled or partially filled by the time it arrives at the cut-out switch 87, the extension 85 will trip the finger to stop the filling machine until this container can be removed.

Extending within the yoke 13 and adapted to be contacted and moved by the empty container which is fed in by a star wheel 130 is one end of a horizontal sliding rod 131. The rod is provided with a cam follower 132 and the opposite end slides in a groove formed in a bracket 133 and carries a counter-weighted dog 134. The dog 134 engages one arm of a bell crank 135 pivoted to the bracket so that the bell crank may be moved about its pivot by longitudinal movement of the rod 131. The opposite arm of the bell crank is attached to one end of a vertical spring loaded push rod 136. The opposite end of the push rod engages a starting switch 137 mounted on a control panel 138 suitably supported within the housing 21. This control panel forms part of the control unit 6 described above. As the container enters the yoke, it pushes the rod 131 radially inward and causes the dog 134 to rotate the bell crank to close the starting switch. It should be noted, however, that as the rod 131 nears the limit of its longitudinal travel, the dog will ride under the end of the bell crank, thereby permitting it to return to its normal position again opening the starting switch 137.

After a container has been properly filled, it is engaged by the wiper 117 and removed from the filling table by the star wheel 117'. Attached to the wiper is a cam 140 that engages the follower at the end of the rod 131 and moves the rod back to its radially extended position. This movement of course brings the pivoted dog behind the bellcrank for the next filling operation.

The electrical control system for operating the machine is generally similar to that shown and described in my co-pending application, Serial No. 383,044, filed March 12, 1941, now Patent 2,357,013. The circuit is such that as a container moves onto the filling table, the starting switch 137 is momentarily closed completing an electrical circuit to open first the steam valve and after a predetermined purging interval, the juice valve which then supplies juice to the container C. During the filling of the container, the stream of juice from the nozzle 45 is surrounded by a sleeve of steam or inert gas delivered through the orifice 46'. The steam or gas also provides a blanket over the rising body of juice in the container to protect it from atmospheric oxidation.

After the body of juice has risen in the container to its desired height, it contacts the electrodes 80 and 81 to complete an electrical circuit to close the valves 4 and 5, thus arresting the flow of juice and protective steam or inert gas.

However, if the container has moved to the point of discharge from the filling table 2 without being completely filled with juice, the pin 85 will coact with the switch 87 to complete one of the electrical circuits illustrated in either Figure 7, 8 or 9.

In Figure 7, I have shown diagrammatically the circuit which is operated by actuation of the cutout switch 87. Leads 119 and 120 of the switch arms 121 and 124 are connected to a source of low potential energy such as, for instance, a 12 volt current. Connected in series with the switch 87 is the winding of a relay 140 and a stop button 141 is also connected in parallel through leads 142 and 143. The button 141 in its closed position makes contact with points 144.

In its normal operating position, the relay 140 is deenergized and armature 146 makes contact with point 147 of one of the conductors leading to the motor control. However, if a container should arrive at the cut-out switch with the electrodes 80 and 81 still in their lowered position, the pin 85 would engage the finger 86, thereby moving contact point 123 into contact with point 125, thus energizing the relay 140 which draws armature 146 away from contact point 147, opening the circuit to the motor control and stopping the operation of the filling machine.

A manually operated pivoted latch 148 is provided to hold the armature in the opened position.

Should the operator desire to stop the filling process while the machine is functioning normally, the button 141 is depressed, energizing the relay 140 and moving armature 146 from point 147 to open the motor control circuit. After the unfilled container has been removed from the table, the machine is again started by a manual actuation of the latch 148, which releases the armature 146 to again close the circuit to the motor control.

Referring to Figure 8 wherein is shown another type of electrical circuit, which may be employed when the filling machine and closer are both driven by the same motor and suitable power take-off means is provided.

The container closer machine (not shown) has a plurality of double contacting switches 150 that are connected in parallel and each switch is adapted to stop the machine if something goes wrong, such as the failure of a lid to be fed to the container, etc. The cutout switch 87 may be one of these switches or it may be connected with them in parallel, as illustrated in Figure 8.

The lower set of contacts of each switch is connected by line 151 to the source of low voltage electrical energy. A conductor 152 connects the lower set of contacts with the spring arm 121 of the cutout switch 87 and the spring arm 124 is connected by the lead 153 with one end of winding 154 of a motor control relay 155. The opposite end of the winding 154 is connected by the line 156 with the source of low voltage.

Connected in parallel with the line 156 and with the upper set of contacts of the switches 150 are a series of signal lamps 157. The upper set of contacts is connected to line 160 through lead 159 and lead 160 is connected to a spring arm 161 having a contact point 162. An insulating block 162' joins the arm 161 with contact arm 121. A signal lamp 163 is connected by line 164 to the line 156 and to a contact point 165 that is adapted to make contact with the point 162 through conductor 166.

The system is such that the relay 155 is normally energized and armature 167 makes contact with its lead to the motor control. If the closer machine fails to function properly, one of the switches 150 breaks contact with the lower set of points and the circuit is opened, de-energizing the relay and causing it to drop out to open the circuit to the motor control and stop the machine. The cutout switch 87 performs in substantially the same manner as described in Figure 7, that is to say, if an unfilled container should reach the point of discharge, the switch 87 is opened to break the circuit to de-energize the relay 155. If either of the switches 150 or 87 opens, the circuit is completed to one of the lights 157 or 163 to inform the operator of the source of trouble.

In Figure 10, there is illustrated a modified form of electrode that may be used. The conduit 75 carries a single conductor 171 that is provided with an electrode 172. The electrode 172 is insulated from the conduit 75 and the fitting 82 of the block 83. The pin 85 makes electrical contact with the electrode 172. A lug 177 is integrally formed with the fitting 82 and an electrode 178 is anchored therein and is thereby grounded to the machine.

In this form the motor control relay 200 has one end of its winding connected through a conductor 201 to one end of a secondary winding 202 of a transformer 203. The opposite end of the secondary winding is grounded as at 204. The opposite end of the winding of the relay 200 is connected by a conductor 205 to the electrode 172. If when the container reaches the point of discharge without being completely filled and the electrodes and the pin 85 are still lowered, the pin 85 will then be in the path of a grounded contact 206.

The primary winding 207 of the transformer 203 is connected to conductors 208 and 209 from a source of electrical energy such as 110 volt alternating curent. The conductor 209 also leads to one side of both the juice and steam valve solenoid windings 63 and 108. The opposite end of the solenoid winding 108 is connected through a conductor 210 to a contact point 211 of a relay 212. The relay armature 213 is adapted to contact the point 211 and is connected through a conductor 214 to the line 208.

This relay 212 is normally open and is also provided with an armature 215, one end of which is connected by a conductor 216 to one pole 137' of the starting switch 137. The armature 215 is adapted to make contact with the point 217 connected by a conductor 218 to the opposite pole 137'' of the starting switch 137. The winding 219 of the relay 212 is connected between the pole 137' of the starting switch 137 and the conductor 201 leading to the secondary winding 202 of the transformer 203.

Shunted across the conductors 210 and 209 is the resistance winding 220 of a thermal switch 221, the bi-metal contact strip 222 of which is connected to one end of the juice solenoid winding the opposite end of which is connected to the line 209. The contact point 223 of the thermal switch is connected with the line 210.

A normally closed relay 224 has one end of its winding connected with the line 201 and its opposite end with the conductor 171 leading to the electrode 172. The armature 225 of the relay 224 is grounded as at 226 and is adapted to contact a point 227 connected by a conductor 228 with the starting switch pole 137''. Current is supplied for operation of the valves and to the transformer 203 for operation of the relays (as seen in Figure 1) by means of brushes 197 which contact a pair of slip rings 198 carried by a distributor bushing 199 affixed to the pipe 30.

In operation, when the starting switch 137 is momentarily closed by a container moving onto the filler table, current is supplied to the relay winding 219 through conductor 201, starting switch 137, relay armature 225, and ground. This causes the winding 219 to be energized and closes the circuit from the conductor 208, armature 213, conductor 210 to the steam solenoid winding 108, and thence to conductor 209 which causes the steam valve 5 to open and supply purging fluid to the container. After a sufficient time to purge the container which is controlled by adjustment of the thermal switch 221, this switch closes and energizes the juice solenoid winding 63 to supply juice to the container.

As the starting switch 137 is only momentarily closed, operating current is maintained to the juice and steam solenoids through the armature 215 of the relay 212 which maintains the relay 212 closed until the container has been filled. When the container is filled, the body of liquid therein bridges the electrodes 172 and 178 to energize the relay winding 224 which causes this relay to drop out and break circuit to the relay 212, thereby de-energizing both the steam and juice solenoids to close their respective valves.

However, should a container reach the point of discharge before being completely filled and the electrodes 172 and 178 still be lowered and the pin 85 in the path of the grounded contact 206, it will, upon reaching this contact, complete the electrical circuit to energize the relay 200, causing this relay to drop out and open the motor control circuit to stop the filling operation.

The operation of the switch 87 is similar to the cutoff arrangement described for Figure 9 in that should an unfilled can reach the point of discharge, the switch 87 will also function to stop the operation until the can is removed from the machine.

From the above description, it is thought apparent that I have provided a method whereby a partially filled or unfilled container is prevented from moving into the closer machine. The system is entirely automatic and is positive in operation and the machine is adaptable for filling containers of all sizes and heights. Furthermore, each container is filled to the same juice level and means are effective when the predetermined level has been attained to arrest the flow of juice into the container.

Also, the juice is introduced into the container surrounded by a blanket of suitable fluid that will positively prevent the access of atmospheric oxygen to the juice during the filling process which of course is most desirable.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. In an apparatus for filling receptacles with oxidizable liquid such as citrus juice, said apparatus having means for moving the receptacle to be filled from a point of feed to a point of discharge thereof, a nozzle positioned above the receptacle and movable therewith for discharging a stream of inert gas thereinto, a second nozzle within the gas nozzle for discharging a stream of the liquid into the container through the stream of gas, valves for controlling the flow of gas and liquid, means for sequentially opening first the gas valve and then the liquid valve, means responsive to a predetermined level of liquid in the receptacle for closing the valves, auxiliary valve closing means positioned adjacent the point of receptacle discharge, an actuating member therefor movable with the receptacle, said actuating member being rendered operative by opening of the liquid valve and rendered inoperative by closing thereof.

2. In an apparatus for filling receptacles with oxidizable liquid such as citrus juice, said apparatus having means for moving the receptacle to be filled from a point of feed to a point of discharge thereof, a nozzle positioned above the receptacle and movable therewith for discharging a stream of inert gas thereinto, a second nozzle within the gas nozzle for discharging a stream of the liquid into the container through the stream of gas, normally closed solenoid valves for controlling the flow of liquid and gas, an electric circuit for the solenoid valves, sequence operated circuit closing means for closing the circuit first to open the gas valve and then the liquid valve, electrodes lowered into the receptacle by opening movement of the liquid valve and raised above the receptacle by closing movement of said valve, circuit breaking means operated by contact of the liquid in the container with said electrodes to break said circuit to allow the valves to close, auxiliary means positioned adjacent the discharge point of the receptacle for breaking said circuit, and an actuating member associated with said electrodes and operative in the lowered position thereof for actuating said auxiliary means to close the valves if the receptacle reaches said discharge point prior to closing of the valves.

3. In an apparatus for filling receptacles with oxidizable liquid such as citrus juice, said apparatus having electrically operated means for moving the receptacle to be filled from a point of feed to a point of discharge thereof, a nozzle positioned above the receptacle and movable therewith for discharging a stream of inert gas thereinto, a second nozzle within the gas nozzle for discharging a stream of the liquid into the container through the stream of gas, normally closed solenoid valves for controlling the flow of liquid and gas, an electric circuit for the solenoid valves, sequence operated circuit closing means for closing the circuit first to open the gas valve and then the liquid valve, electrodes lowered into the receptacle by opening movement of the liquid valve and raised above the receptacle by closing movement of said valve, circuit breaking means operated by contact of the liquid in the container with said electrodes to break said circuit to allow the valves to close, auxiliary means positioned adjacent the discharge point of the receptacle for breaking said circuit, rendering inoperative said electrically operated receptacle means, and an actuating member associated with said electrodes and operative in the lowered position thereof for actuating said auxiliary means to close the valves if the receptacle reaches said discharge point prior to closing of the valves.

4. In an apparatus for filling receptacles with liquid, said apparatus having means for moving the receptacle to be filled from a point of feed to a point of discharge thereof, a nozzle positioned above the receptacle and movable therewith for discharging the liquid into the container, a normally closed solenoid valve for controlling flow of liquid from the nozzle, an energizing circuit for the solenoid valve including a normally closed relay and normally open contacts, means for closing the contacts to open the valve, a pair of spaced electrodes movable with the receptacle and adapted to have a conductive connection established therebetween by liquid at a predetermined level in the receptacle for completing an energizing circuit through the relay to open the valve circuit to close the valve, means actuated by the valve to lower the electrodes to said predetermined level when the valve opens and raise them above said level when said valve closes, and means positioned adjacent the point of receptacle discharge and in the path of the lowered electrodes for establishing a conductive connection therebetween if the receptacle reaches the point of discharge prior to closing of the valve.

5. In an apparatus for filling receptacles with liquid, said apparatus having means for moving the receptacle to be filled from a point of feed to a point of discharge thereof, a nozzle positioned above the receptacle and movable therewith for discharging the liquid into the container, a normally closed solenoid valve for controlling flow of liquid from the nozzle, an energizing circuit for the solenoid valve including a normally closed relay and normally open contacts, means for closing the contacts to open the valve, a pair of spaced electrodes movable with the receptacle and adapted to have a conductive connection established therebetween by liquid at a predetermined level in the receptacle for completing an energizing circuit through the relay to open the valve circuit to close the valve, means actuated by the valve to lower the electrodes to said predetermined level when the valve opens and raise them above said level when said valve closes, a contactor movable with one electrode and electrically connected therewith, a contact electrically connected with the other electrode and positioned adjacent the point of receptacle discharge and in the path of the lowered contactor to engage the same and establish said relay energizing circuit to close said valve if the receptacle reaches the point of discharge prior to closing of said valve.

6. In an apparatus for filling receptacles with oxidizable liquid such as citrus juice, said apparatus having means for moving the receptacle to be filled from a point of feed to a point of discharge thereof, a nozzle positioned above the receptacle and movable therewith for discharging a stream of inert gas thereinto, a second nozzle within the gas nozzle for discharging a stream of the liquid into the container through the stream of gas, normally closed solenoid valves for controlling the flow of liquid and gas, an electric circuit for the solenoid valves, sequence operated circuit closing means for closing the circuit first to open the gas valve and then the liquid valve, a pair of spaced electrodes movable with the receptacle and adapted to have a conductive connection established therebetween by liquid at a predetermined level in the receptacle for completing an energizing circuit through the relay to open the valve circuit to close the valves, means actuated by the liquid valve to lower the electrodes to said predetermined level when the liquid valve opens and raise them above said level when said valve closes, and means positioned adjacent the point of receptacle discharge and in the path of the lowered electrodes for establishing a conductive connection therebetween if the receptacle reaches the point of discharge prior to closing of the valves.

7. In an apparatus for filling receptacles with oxidizable liquid such as citrus juice, said apparatus having means for moving the receptacle to be filled from a point of feed to a point of discharge thereof, a nozzle positioned above the receptacle and movable therewith for discharging a stream of inert gas thereinto, a second nozzle within the gas nozzle for discharging a stream of the liquid into the container through the stream of gas, normally closed solenoid valves for controlling the flow of liquid and gas, an electric circuit for the solenoid valves, sequence operated circuit closing means for closing the circuit first to open the gas valve and then the liquid valve, a pair of spaced electrodes movable with the receptacle and adapted to have a conductive connection established therebetween by liquid at a predetermined level in the receptacle for completing an energizing circuit through the relay to open the valve circuit to close the valves, means actuated by the liquid valve to lower the electrodes to said predetermined level when the valve opens and raise them above said level when said valve closes, a contactor movable with one electrode and electrically connected therewith, a contact electrically connected with the other electrode and positioned adjacent the point of receptacle discharge and in the path of the lowered contactor to engage the same and establish said relay energizing circuit to close said valve if the receptacle reaches the point of discharge prior to closing of said valves.

8. In an apparatus for filling receptacles with liquid, said apparatus having electrically operated means for moving the receptacle to be filled from a point of feed to a point of discharge thereof, a nozzle positioned above the receptacle and movable therewith for discharging the liquid thereinto, a normally closed solenoid valve for controlling the flow of liquid from said nozzle, an energizing circuit for the solenoid valve including a normally closed relay and normally open contacts, means for closing said contacts to open the valve, a pair of spaced electrodes movable with the receptacle and adapted to have a conductive connection established therebetween by liquid at a predetermined level in the receptacle for completing an energizing circuit through the relay to open the circuit and permit the valve to close, means actuated by the valve to lower the electrodes to the predetermined level when the valve opens and raise them above said level when the valve closes, a second normally closed relay establishing an energizing circuit for the receptacle moving means, and means positioned adjacent the point of receptacle discharge and in the path of the lowered electrodes for establishing a conductive connection therebetween to complete an energizing circuit to both relays to open the same and break the energizing circuits to the valve and receptacle moving means if the receptacle reaches the point of discharge prior to closing of said valve.

9. In an apparatus for filling receptacles with liquid between a point of introduction of the receptacle to the apparatus and a point of discharge of the receptacle therefrom, said apparatus having electrically operated means for moving the receptacle from said point of introduction to the point of discharge, a normally closed valve positioned above the receptacle and movable therewith for discharging the liquid thereinto, means for opening the valve and means for closing said valve when the liquid reaches a predetermined level in the container, the improvement comprising an energizing circuit for the receptacle moving means including a normally closed relay, an energizing circuit for the relay having normally open switch means positioned adjacent the point of receptacle discharge, switch closing means adjacent the receptacle and movable therewith, and means actuated by the valve to move the switch closing means in position to actuate said switch means when the valve is open and out of said actuating position when the valve is closed whereby movement of the receptacle is arrested if it reaches the point of discharge prior to filling to the desired level.

RONALD B. McKINNIS.